United States Patent [19]

Inui et al.

[11] Patent Number: 4,509,385
[45] Date of Patent: Apr. 9, 1985

[54] CONSTRUCTION FOR PREVENTING WEAR OF SHIFT FORK IN TRANSMISSION MANIPULATION DEVICE FOR MANUAL TRANSMISSION

[75] Inventors: Masaki Inui; Yasuyoshi Yasui, both of Toyota, Japan

[73] Assignee: Toyota Jidosha Kabushiki Kaisha, Aichi, Japan

[21] Appl. No.: 452,968

[22] Filed: Dec. 27, 1982

[51] Int. Cl.³ .......................... G05G 5/10; G05G 9/18
[52] U.S. Cl. .......................................... 74/477; 74/475
[58] Field of Search ...................... 74/477, 483 R, 475

[56] References Cited

U.S. PATENT DOCUMENTS

| 2,690,684 | 10/1954 | Stemler | 74/477 |
| 3,962,930 | 6/1976 | Frazee | 74/477 |
| 4,277,983 | 7/1981 | Izumi et al. | 74/477 |
| 4,290,318 | 9/1981 | Ookubo et al. | 74/477 |
| 4,305,309 | 12/1981 | Ookubo et al. | 74/477 |

OTHER PUBLICATIONS

Japanese Utility Model Specification for public inspection 48-19691, (1973).

*Primary Examiner*—Allan D. Herrmann
*Attorney, Agent, or Firm*—Parkhurst & Oliff

[57] ABSTRACT

Disclosed is a transmission manipulation device for a transmission which is improved in eliminating abnormal circumferential wear of a shift fork due to pressure contact with the sleeve of a clutch mechanism incorporated in the transmission. The device has a shift and select lever shaft provided with a first retaining portion and a second retaining portion. The second retaining portion is engageable with the engaging portion of the first shift head only when a first retaining portion engages with the engaging portion of one of a plurality of shift forks on the lever shaft. When the shift and select lever shaft is rotated after axial movement against the resilient force of a resilient member, the second retaining portion is retained by the first shift head to prevent axial movement of the lever shaft due to the reactional force of the resilient member.

1 Claim, 7 Drawing Figures

CONSTRUCTION FOR PREVENTING WEAR OF SHIFT FORK IN TRANSMISSION MANIPULATION DEVICE FOR MANUAL TRANSMISSION

BACKGROUND OF THE INVENTION

The present invention relates generally to a manually operable transmission and, more particularly, to a construction for preventing wear of the shift fork in the manipulating device for manipulating the manual transmission.

The manipulation device for a transmission to which the present invention pertains has a first fork shaft and a second fork shaft parallel to each other and carried by the case of the transmission axially movably and nonrotatably. The first fork shaft carries a plurality of shift forks axially movably and rotatably. The shift forks have engaging portions arranged in the direction perpendicular to the fork shaft. The transmission case carries also a shift and select lever shaft perpendicular to the fork shafts for axial movement and rotation. The lever shaft is held in a neutral position through a resilient member, and is provided with a retaining portion capable of selectively engaging the engaging portion of one of the shift forks. A first shift head having an engaging portion, which is in a side-by-side relation to the engaging portions of the shift forks, is fixed to the first fork shaft. The lever shaft is provided with a second retaining portion which is capable of engaging the engaging portion of the first shift head only when the first retaining portion is in engagement with the engaging portion of one of the shift forks on the first fork shaft. At the same time, a single shift fork is fixed to the second fork shaft. Also, a second shift head having an engaging portion in a side-by-side relation to the engaging portion is fixed to the second fork shaft. The first retaining portion of the lever shaft is selectively engageable with the engaging portion of the shift head. With this arrangement, a shift fork axially movably and rotatably mounted on the first fork shaft functions as a means for preventing the rotation of the fork shaft through engagement with the sleeve of the clutch mechanism of the transmission. This arrangement, therefore, is much more reasonable as compared with the conventional arrangement in which a shift fork as a separate means is splined to the fork shaft to prevent the rotation of the shift fork. Namely, in the known arrangement in which the shift fork is splined to the fork shaft to prevent the rotation of the shift fork, there is a problem in terms of precision of machining. More specifically, there is a tendency that a play is formed in the fitting portions and friction in the fitting portion tends to grow, resulting in a deteriorated feeling in shifting manipulation, as well as high cost of production. This problem, however, can effectively be eliminated in the transmission manipulation device to which the invention pertains since rotation of the shift fork is prevented by arranging such that the shift fork is rotatably fitted to the fork shaft and is caused to engage with the sleeve of the clutch mechanism. It will be seen that this arrangement to which the invention pertains is quite reasonable in this regard. This arrangement, however, suffers from the following disadvantages. Assuming here that the shift and select lever shaft is manipulated for selection and shifting against the resilient force of the resilient member for biasing the lever shaft to the neutral position, the resilient member naturally develops a repulsive force. If this repulsive force is borne by the shift fork on the first fork shaft as in the case of the conventional arrangement, the repulsive force tends to rotate the shift fork on the first fork shaft to bring the shift fork into close contact with the sleeve of the clutch mechanism. In consequence, an abnormal wear is caused in the circumferential region of the shift fork contacting the sleeve as the sleeve rotates.

SUMMARY OF THE INVENTION

Accordingly, an object of the invention is to provide a construction for preventing wear of the shift fork, capable of preventing the circumferential abnormal wear of the shift fork, which wear is caused by the pressure contact between the shift fork and the sleeve of the clutch mechanism of the transmission due to reactional force of the resilient member as a result of the selecting manipulation of the shift and select lever shaft.

To this end, according to the invention, there is provided a construction for preventing circumferential abnormal wear of the shift fork, which construction is suitable for use in a transmission having the following construction. Namely the transmission has a transmission case, a first fork shaft and a second fork shaft mounted on the transmission case axially movably and nonrotatably, a plurality of shift forks provided on the first fork shaft axially movably and rotatably, the shift forks having engaging portions aligned in the direction perpendicular to the fork shafts, a shift and select lever shaft carried by the transmission case axially movably and rotatably so as to extend in the direction perpendicular to the fork shaft, a resilient member through which the lever shaft is held in a neutral position, a first retaining portion provided on the lever shaft and selectively engageable with the engaging portion of one of the shift forks, a first shift head fixed to the first fork shaft and having an engaging portion arranged in a side-by-side relation to the engaging portions of the shift forks, a second retaining portion provided on the lever shaft and engageable with the engaging portion of the first shift head only when the first retaining portion is in engagement with the engaging portion of any one of the shift forks on the first fork shaft, a single shift fork fixed to the second fork shaft, and a second shift head fixed to the second fork shaft and having an engaging portion arranged in a side-by-side relation to the engaging portions, the first engaging portion on the lever shaft being selectively engageable with the engaging portion of the second shift head.

The construction for preventing wear of shift fork is characterized in that, when the lever shaft is rotated while the lever shaft has been moved axially against the force of the resilient member to hold the first retaining portion in engagement with the engaging portion of the second shift head, the second retaining portion is retained by the first shift head thereby to prevent axial movement of the lever shaft due to repulsive forces of the resilient member.

The above and other objects, features and advantages of the invention will become apparent from the following description of preferred embodiments taken in conjunction with the accompanying drawings.

BRIEF DESCRIPTION OF THE DRAWINGS

FIGS. 4a, 4b and 4c are enlarged views of the connection between the lever shaft and the fork shaft, wherein FIG. 4a shows the state in which the neutral position is selected, FIG. 4b shows the state in which the first or second speed gear is selected, and FIG. 4c shows the state in which the fifth speed or the reverse gear is selected, respectively.

DESCRIPTION OF THE PREFERRED EMBODIMENTS

Figure 1:
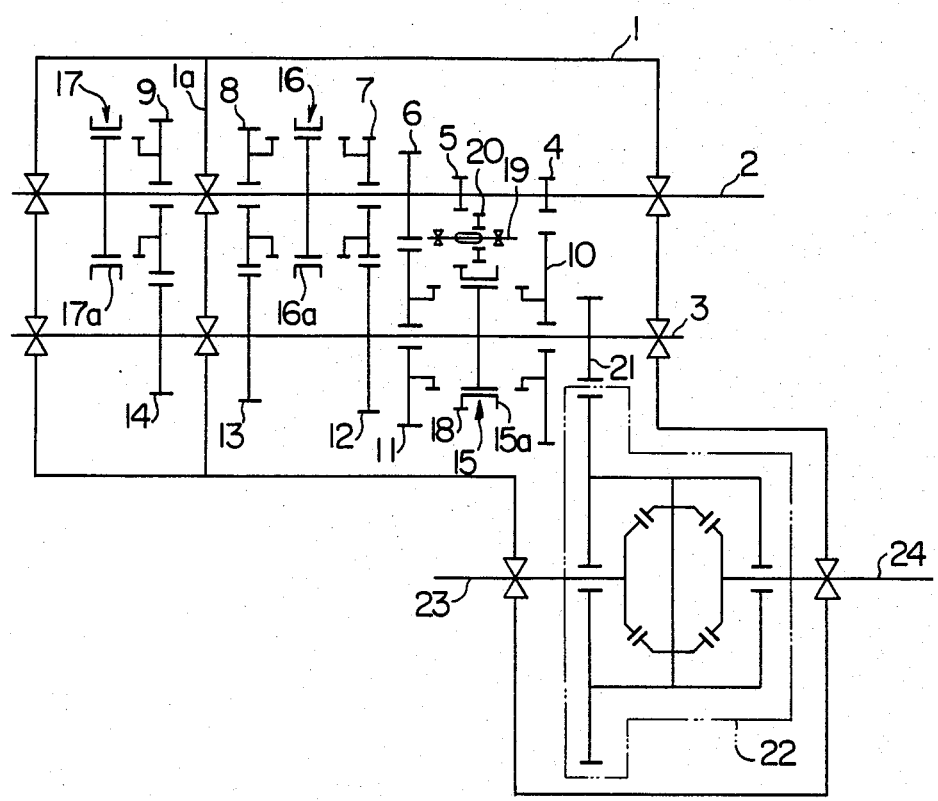
FIG. 1 is a skeleton diagram of a manual transmission.

A preferred embodiment of the invention will be described hereinunder with specific reference to the attached drawings. First of all, a manual transmission having five forward speed gears and one reverse gear, to which the invention pertains, will be explained with reference to the skeleton diagram shown in FIG. 1. The transmission has a case 1 which rotatably carries an input shaft 2 and an output shaft 3 arranged in parallel with each other. First speed gear 4, reverse gear 5 and second speed gear 6 are fixed to the input shaft 2 in the mentioned order from the right side as viewed in the drawing. Third speed gear 7, fourth speed gear 8 and fifth speed gear 9 also are rotatably mounted on the input shaft 2. The output shaft 3 rotatably carries counter gears 10 and 11 normally meshing with the first speed gear 4 and the second speed gear 6, and counter gears 12 to 14 normally meshing with the third to fifth speed gears 7 to 9 are fixed to the output shaft 3. The counter first gear 10 and counter second gear 11 are adapted to rotate as a unit with the output shaft 3 as a driving connection therebetween is established by the sleeve 15a of a first clutch mechanism 15, and the third speed gear 7 and fourth speed gear 8 are adapted to rotate as a unit with the input shaft 2 as a driving connection therebetween is established by the sleeve 16a of a second clutch mechanism 16. Also, the fifth speed gear 9 is adapted to rotate as a unit with the input shaft 2 as a driving connection therebetween is established by the sleeve 17a of a third clutch mechanism 17. Through this transmission, rotation of the input shaft 2, which is driven by the engine (not shown) through the clutch, is transmitted to the output shaft 3 at the selected speed reduction ratio. A counter reverse gear 18 is provided on the outer periphery of the sleeve 15a of the clutch mechanism 15. A reverse idler shaft 19 rotatably mounted on the case 1 carries a reverse idler gear 20 axially movably and corotatably, i.e. for a rotation as a unit with the reverse idler shaft 19. With this arrangement, as this idler gear 20 axially moves to mesh with the reverse gear 5 and the counter reverse gear 18 simultaneously, rotation of the input shaft 2 is transmitted to the output shaft 3 in the reverse direction. Rotation of the output shaft 3 is transmitted first to a differential gear 22 through the drive gear 21 of the output shaft 3 and then to the left and right drive shafts 23 and 24. In FIG. 1, the transmission is shown as being in the neutral position in which rotation of the input shaft 2 is not transmitted to the output shaft 3.

A description will be made hereinunder as to the transmission manipulation device by which the speed changing operation is effected through movement of the clutch sleeves 15a to 17a of the clutch mechanism 15 to 17, with reference to FIGS. 2 to 5.

Figure 2:
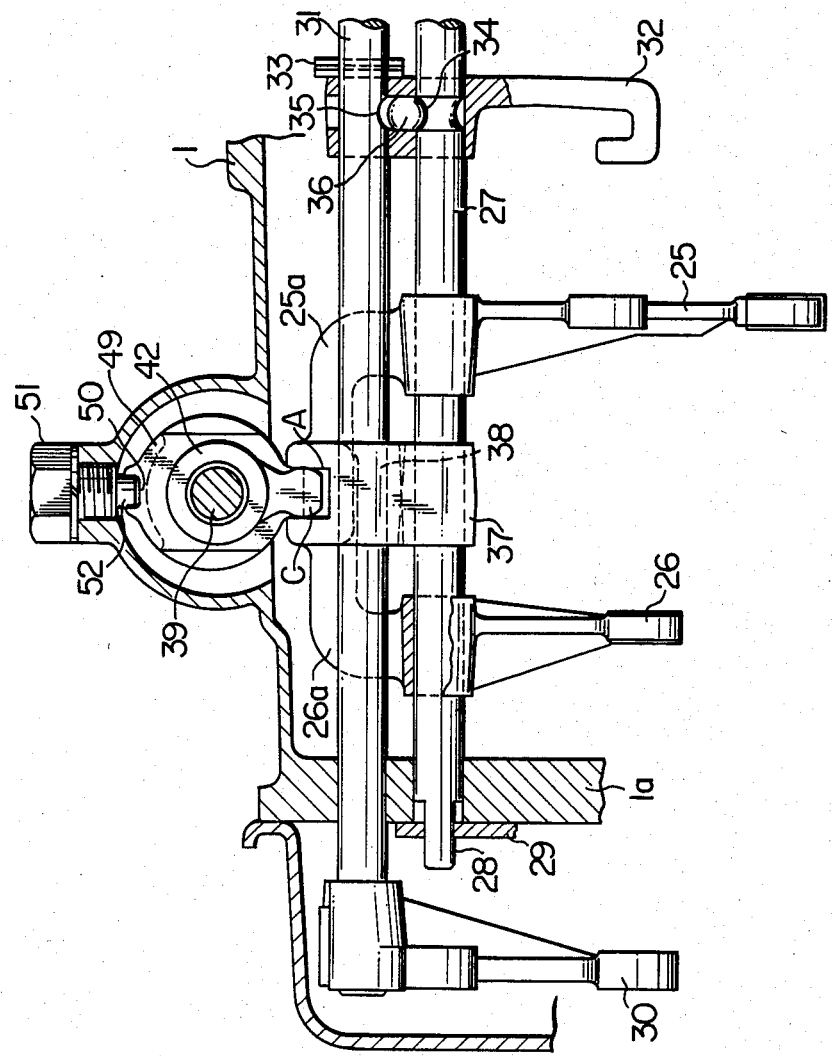
FIG. 2 is a front elevational sectional view of a transmission manipulation device.
Figure 3:
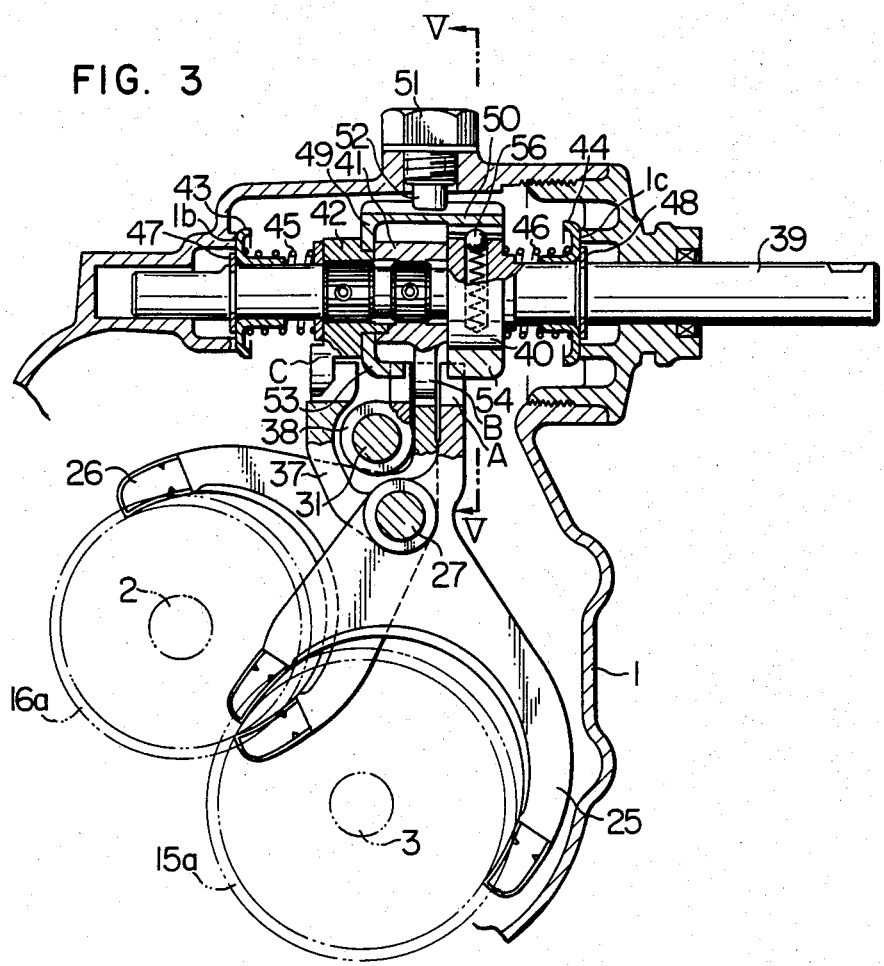
FIG. 3 is a side elevational sectional view of the transmission manipulation device.
Figure 5:
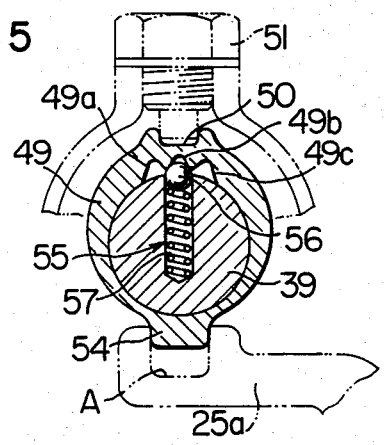
FIG. 5 is a sectional view taken along the line V—V of FIG. 3.

As shown in FIGS. 2 and 3, shift forks 25 and 26 are arranged to engage with the sleeves 15a and 16a of the first and second clutch mechanisms 15 and 16, respectively, in a manner to permit these sleeves 15a and 16a to rotate and move in the axial direction. The first shift fork 25 and second shift fork 26 are axially movably and rotatably mounted on a first fork shaft 27 which in turn is mounted on the case 1 axially movably and in parallel with the input shaft 2. The left end of the fork shaft 27 as viewed in FIG. 2 is provided with two flat surfaces 28 and is prevented from rotation by means of the retainer 29 secured to an intermediate wall 1a of the casing 1. Also, a third shift fork 30 engages with the sleeve 17a of the third clutch mechanism 3 in a manner to permit the sleeve 17a to rotate and move axially. The shift fork 30 is fixed to the second fork shaft 31 which is axially movably mounted on the case 1 to extend through the intermediate wall 1a of the case 1. The fork shaft 31 extends in parallel with the shaft 27 at the front upper side thereof (left upper side as viewed in FIG. 3). A reverse shift arm 32 is axially movably carried by the right ends of two fork shafts 27 and 31, and is connected to the reverse idler gear 20 in a manner to permit the gear 20 to rotate and move axially. The shift arm 32 is prevented from moving to the right by means of a retaining pin 33 which is secured to the second fork shaft 31, and is provided with a one-way pin 36 engageable with opposing engaging grooves 34 and 35 which are formed in both fork shafts 27 and 31. With this arrangement, when the retaining pin 33 causes the shift arm to move together with the fork shaft 31 upon the leftward movement of the second shift fork 31, the one-way pin 36 leaves the engaging groove 34 in the first fork shaft 27, which is held stationary, and moves upward into engagement with the engaging groove 35 of the second fork shaft 31. Therefore, when the second fork shaft 31 is returned, the shift arm 32 is moved together with the fork shaft 31. Upon the rightward movement of the second fork shaft 31 and upon the movement of the first fork shaft 27 to the left and right, the one-way pin 36 engages the engaging groove of the shaft which is held stationary, thereby to hold the reverse shift arm immovable.

A first shift head 37 is fixed to the first fork shaft 27 between the first shift fork 25 and the second shift fork 26. A second shift head 38 is fixed to the second fork shaft 31 behind the first shift head 37. A head portion 26a disposed rearwardly from the second shift head 38 is formed on the second shift fork 26 while a head portion 25a disposed rearwardly from the head portion 26a of the second shift fork 26 is provided on the first shift fork 25. The shift heads 37, 38 and head portions 25a, 26a are formed with engaging grooves A—A as shown in FIG. 4. When the transmission is in the neutral position, the engaging grooves A—A are aligned on a line which intersects the fork shaft at a right angle.

Figure 4A:
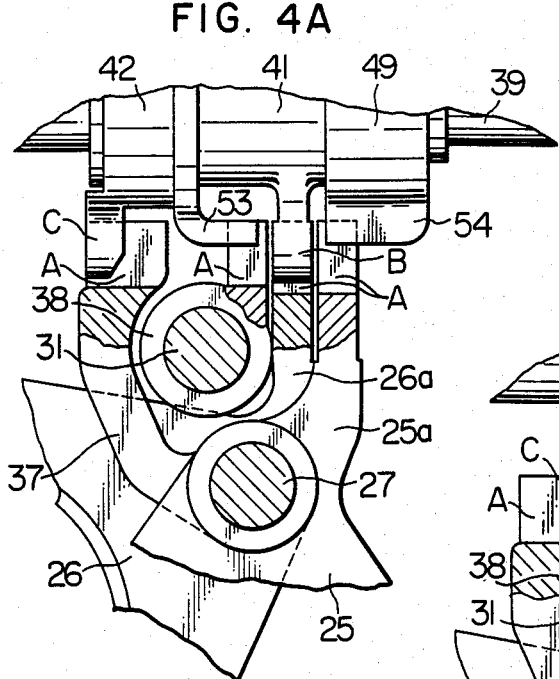
Figure 4B:
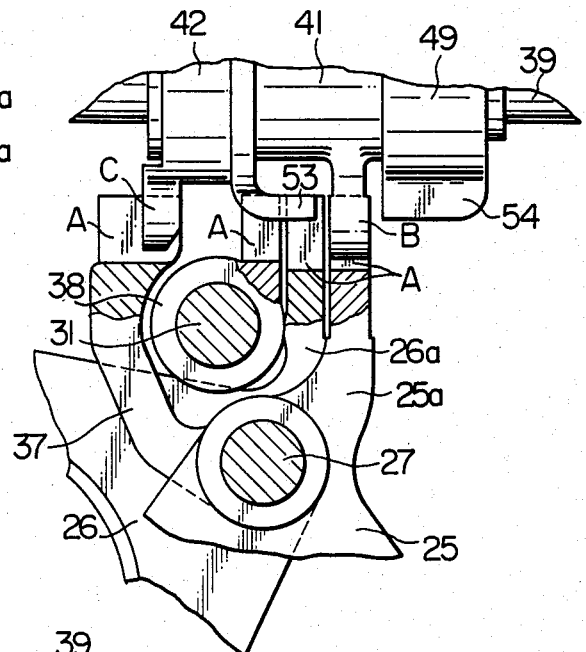
Figure 4C:
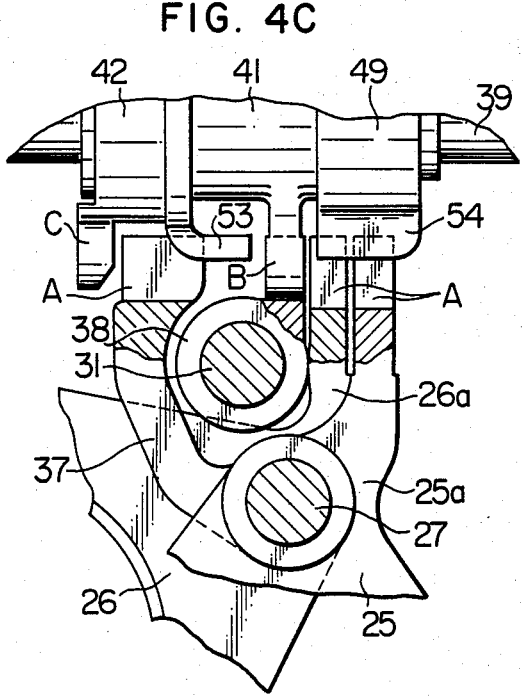

The case 1 carries rotatably and axially movably also a shift and select lever shaft 39 which extends above the fork shafts 27 and 31 perpendicularly to the shafts 27 and 31. The lever shaft 39 is moved in the axial direction by the selecting operation of the shift lever (not shown) through a remote mechanism, and is rotated by the shifting operation of the shift lever through the remote mechanism. A large diameter portion 40 is formed on the central portion of the lever shaft 39. First inner lever 41 and second inner lever 42 are fixed to the lever shaft 39 at the front side of the portion 40 in a side-by-side relation. Front and rear washers 43 and 44 are fitted on both ends of the lever shaft 39 for axial movement. Front and rear return springs 45 and 46 are provided between the front washer 43 and the second inner lever 42 and between the rear washer 44 and the portion 40, respectively. The washers 43 and 44 are prevented from coming off from the lever shaft 39 by the front and rear snap rings 47 and 48 attached to both ends of the lever shaft 39, and abut the front and rear walls 1b and 1c of the case 1 thereby to hold the lever shaft 39 in the neutral position. The first inner lever 41 is provided with a first retaining projection B which extends downwardly and engages, when the lever shaft 39 is in the neutral position, with the engaging groove A in the second shift fork 26 as shown in FIG. 4a. A second retaining projection C projects downwardly from the second inner lever 42, and is allowed to engage with the engaging groove A of the first shift head 37 only when the first inner lever 41 is in engagement with the engaging groove A of the first shift fork 25 or the engaging groove A of the second shift fork 26, as shown in FIGS. 4a and 4b. When the first inner lever 41 is rotated while it is engaged by the second shift head 38, the rear end surface 42a of the second inner lever 42 is retained by the front end surface 37a of the first shift head 37 by the repulsive force of the return spring 45, thereby not to impart any rotational force to the second shift fork 26. The lever shaft 39 has an interlock plate 49 which covers the first inner lever 41 and permits the lever shaft 39 to rotate. A groove 50 is formed in the upper surface of the interlpck plate 49 to extend in the axial direction of the lever shaft 39, and is adapted to be engaged by the end 52 of the lock bolt 51 which is screwed on the upper portion of the case 1, so as to prevent the rotation of the interlock plate 49. As shown in FIGS. 4a to 4c, front and rear retaining projections 53 and 54 are formed at the lower end of the interlock plate 49 to position the retaining projection B of the first inner lever 41 therebetween. These retaining projections 53 and 54 are adapted to engage with the engaging grooves A—A which are not engaged by the retaining projection B of the inner lever 41 or by the retaining projection C of the inner lever 42. Namely, when the lever shaft 39 is in the neutral position, the retaining projections 53 and 54 serve to hold the second shift head 38 and the first shift fork 25 immovable as shown in FIG. 4a. However, when the first inner lever 41 engages with the first shift fork 25, the retaining projections 53 and 54 hold the second shift fork 26 and the second shift head 38 immovable as shown in FIG. 4b. Also, when the first inner lever 41 is in engagement with the second shift head 38, the retaining projections 53 and 54 hold the first shift head 37, first shift fork 25 and second shift fork 26 immovable as shown in FIG. 4c. A latch mechanism provided on the shaft 39 at a portion thereof near the large diameter portion 40 has a ball 56 which is pressed into one of the three engaging grooves 49a to 49c in the inner peripheral surface of the interlock plate 49 by the biasing force of the spring 57, thereby to hold the lever shaft 39 in a selected rotational position (see FIG. 5).

In the transmission manipulation device having the construction explained hereinbefore, the first speed position is attained in a manner explained hereinunder. When a selecting operation is effected by moving the shift and select lever shaft 39 rearwardly as viewed in FIG. 3 from the neutral position against the force of the return spring 46, the retaining projection B of the first inner lever 41 is brought into engagement with the engaging groove A of the first shift fork 25. Then, as a shifting operation is effected by rotating the lever shaft 39 counter-clockwise as viewed in FIG. 2, the first shift fork 25 is moved to the right, so that the sleeve 15a of the first clutch mechanism 15 is connected to the counter first gear 10. Since the shifting operation is effected with the retaining projection C of the second inner lever 42 engaging the engaging groove A of the first shift head 37, the first shift fork 25 and first fork shaft 27 are moved as a unit as the lever shaft 39 is rotated. In this state, the second shift fork 26 and second shift head 38 are held immovable since the engaging grooves A, A thereof are engaged by the retaining projection 53 of the interlock plate 49, so that the second shift fork 26 is moved along the first fork shaft 27 relative thereto.

For attaining the second speed position, a shifting operation is effected by rotating the shaft 39 in the direction opposite to the direction of rotation in the first speed position. Thus the first shift fork 25 is moved to the left and the sleeve 15a is connected to the counter second gear 11. In this case also, the first shift fork 25 moves as a unit with the fork shaft 27, as in the case of the first speed position.

For attaining the third speed position, a shifting operation is effected by rotating the shift and select lever shaft 39 counter-clockwise as viewed in FIG. 2. Thus the second shift fork 26 engaged by the retaining projection B of the first inner lever 41 is moved to the right thereby to connect the sleeve 16a of the second clutch mechanism 16 to the third speed gear 7. Since the shifting operation is effected while the retaining projection C of the second inner lever 42 is in engagement with the engaging groove A in the first shift head 37, the second shift fork 26 and first fork shaft 27 are moved as a unit upon the rotation of the lever-shaft 39. In this state, the retaining projections 53 and 54 on the interlock plate 49 are held in engagement with the engaging grooves A, A in the first shift fork 25 and second shift head 38 thereby to hold the shift fork 25 and the shift head 38 immovable, so that the first shift fork 25 slides along the first fork shaft 27 relative thereto.

For attaining the fourth speed position, a shifting operation is effected by rotating the lever shaft 39 in the direction opposite to that in the third speed position. Thus the second shift fork 26 is moved to the left to connect the sleeve 16a to the fourth speed gear 8. In this case also, the second shift fork 26 moves as a unit with the first shift fork 27 as in the case of the third speed position.

For attaining the fifth speed position, a shifting operation is effected by moving the shift and select lever shaft 39 forwardly from the neutral position against the force of the return spring 45. Thus the retaining projection B of the first inner lever 41 is brought into engagement with the engaging groove A of the second shift head 38. Then, as a shifting operation is effected by rotating the lever shaft 39 counter-clockwise as viewed in FIG. 2, the third shift fork 30 is moved to the right together with the second fork shaft 31, so that the sleeve 17a of the third clutch mechanism 17 is connected to the fifth gear 9. The first shift head 37, first shift fork 25 and second shift fork 26 are held immovable since the retaining projections 53 and 54 of the interlock plate 49 are held in engagement with the engaging grooves A—A thereof. The reverse shift arm 32 also is held immovable since the one-way pin 36 is held in engagement with the engaging groove 34 of the first fork shaft 27 which is held stationary as a unit with the first shift head 37. In this state, the repulsive force of the return spring 45 is borne by the second inner lever 42 which is retained by the first shift head 37, unlike the conventional arrangement in which the repulsive force is borne by the second shift fork 26. According to the invention, therefore, it is possible to prevent circumferential abnormal wear of the shift fork 26 which is inevitable in the conventional arrangement due to pressure contact between the clutch sleeve 16a of the clutch mechanism 16.

Needless to say, the neutral position of the transmission is resumed by reversing the procedure in each case.

For the reversing, a shifting operation is effected by rotating the lever shaft 39 in the direction opposite to that in the fifth speed position. Thus the second fork shaft 31 is moved to the left and the reverse shift arm 32 is moved as a unit with the shaft 31 by means of the engaging pin 33, so that the reverse idler gear 20 is brought into engagement with the reverse gear 5 and the counter reverse gear 18 simultaneously. The circumferential abnormal wear of the shift fork 26 is prevented also in this case for the same reason as that stated in connection with the fifth speed position. For resuming the neutral position from the reversing position, the reverse shift arm 32 can be reset together with the second fork shaft 31 to resume the neutral position since the one-way pin 36 has been brought into engagement with the engaging groove 35 of the second fork shaft 31 in the course of shifting operation for reversing.

As will be fully understood from the foregoing description, according to the invention, there is provided a transmission manipulation device in which the second retaining portion of the shift and select lever shaft is caused to engage with the first shift head fixed to the first fork shaft which in turn is fixed against rotation. With this arrangement, the repulsive force generated during selecting operation of the lever shaft is not transmitted to the shift fork, so that the circumferential abnormal wear of the shift fork, which is inevitable in the conventional arrangement, can be avoided advantageously.

Although the invention has been described through specific terms, it is to be noted here that the described embodiment is not exclusive and various changes and modifications thereof may be imparted thereto without departing from the scope of the invention which is limited solely by the appended claim.

What is claimed is:

1. A transmission comprising a transmission case, a first fork shaft and a second fork shaft, said second fork shaft being axially movably and nonrotatably mounted within said transmission case, a plurality of shift forks axially movably and rotatably provided on said first fork shaft, each said shift fork having engaging portions aligned in a direction perpendicular to a longitudinal axis defined by said fork shafts, a shift and select lever shaft axially movably and rotatably carried by said transmission case and extending in a direction perpendicular to said longitudinal axis of said fork shafts, a resilient member through which said lever shaft is held in a neutral position, a first retaining portion provided on said lever shaft and selectively engageable with the engaging portion of one of said shift forks, a first shift head fixed to said first fork shaft having an engaging portion arranged in a side-by-side relation to said engaging portions of said shift forks, a second retaining portion provided on said lever shaft being engageable with the engaging portion of said first shift head only when said first retaining portion is in engagement with the engaging portion of any one of said shift forks on said first fork shaft, a single shift fork fixed to said second fork shaft, and a second shift head fixed to said second fork shaft having an engaging portion arranged in a side-by-side relation to said engaging portions of said shift forks, said first engaging portion on said lever shaft being selectively engageable with the engaging portion of said second shift head, whereby as said lever shaft is rotated while said lever shaft has been moved axially against the force of said resilient member to hold said first retaining portion in engagement with the engaging portion of said second shift head, said second retaining portion is retained by said first shift head to prevent the axial movement of said lever shaft due to repulsive forces of said resilient member and thereby prevent wear of said shift forks.

* * * * *